(12) United States Patent
Katsuma

(10) Patent No.: US 6,646,817 B2
(45) Date of Patent: Nov. 11, 2003

(54) OBJECTIVE LENS FOR OPTICAL RECORDING MEDIA AND OPTICAL PICKUP APPARATUS USING THE SAME

(75) Inventor: Toshiaki Katsuma, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 102 days.

(21) Appl. No.: 09/864,236

(22) Filed: May 25, 2001

(65) Prior Publication Data
US 2002/0012175 A1 Jan. 31, 2002

(30) Foreign Application Priority Data
Jun. 20, 2000 (JP) .......................... 2000-185281

(51) Int. Cl.[7] ............................. G02B 13/18; G02B 3/02
(52) U.S. Cl. ..................... 359/719; 359/721; 359/796
(58) Field of Search .............................. 359/719, 721, 359/722, 796, 793–795, 656, 661

(56) References Cited

U.S. PATENT DOCUMENTS 5,225,928 A * 7/1993 Dugan ...................... 359/356
5,479,296 A * 12/1995 Maruyama et al. ......... 359/793
5,657,171 A * 8/1997 Maruyama et al. ......... 359/793

OTHER PUBLICATIONS

Japanese Patent Office, Japanese Unexamined Patent Publications No.: 9–145994, Publication Date: Jun. 6, 1997, Application No.: 7–327882, Filing Date: Nov. 24, 1995, pp. 1–10 (English Language Abstract Provided).

Japanese Patent Office, Japanese Unexamined Patent Publications No.: 8–62493, Publication Date: Mar. 8, 1966, Application No.: 7–167211, Filing Date: Jul. 3, 1995, pp. 1–35 (English Language Abstract Provided).

* cited by examiner

Primary Examiner—Jordan M. Schwartz
(74) Attorney, Agent, or Firm—Snider & Asscociates; Ronald R. Snider

(57) ABSTRACT

An objective lens for converging two wavelengths of light to their predetermined positions is constituted by two or three lenses. Respective materials for forming adjacent lenses are chosen such that the respective refractive indices of adjacent lenses substantially equal each other with respect to only one of the two wavelengths of light, whereas the form of each lens surface is configured so as to suppress aberration in the objective lens as a whole.

10 Claims, 11 Drawing Sheets

EXAMPLE 1 WHEN LENS IS USED FOR DVD (USED WAVELENGTH : 650nm)

EXAMPLE 1 WHEN LENS IS USED FOR CD-R (USED WAVELENGTH : 780nm)

FIG.1A
EXAMPLE 1  WHEN LENS IS USED FOR DVD
(USED WAVELENGTH : 650nm)

FIG.1B
EXAMPLE 1  WHEN LENS IS USED FOR CD-R
(USED WAVELENGTH : 780nm)

FIG.2A
EXAMPLE 2
WHEN LENS IS USED FOR DVD
(USED WAVELENGTH : 650nm)

FIG.2B
EXAMPLE 2
WHEN LENS IS USED FOR CD-R
(USED WAVELENGTH : 780nm)

FIG.3A
EXAMPLE 3  WHEN LENS IS USED FOR DVD
(USED WAVELENGTH : 650nm)

FIG.3B
EXAMPLE 3  WHEN LENS IS USED FOR CD-R
(USED WAVELENGTH : 780nm)

FIG.4A
EXAMPLE 4 — WHEN LENS IS USED FOR DVD (USED WAVELENGTH : 650nm)

FIG.4B
EXAMPLE 4 — WHEN LENS IS USED FOR CD-R (USED WAVELENGTH : 780nm)

FIG.5A
EXAMPLE 5 — WHEN LENS IS USED FOR DVD (USED WAVELENGTH: 650nm)

FIG.5B
EXAMPLE 5 — WHEN LENS IS USED FOR CD-R (USED WAVELENGTH: 780nm)

FIG.7A
EXAMPLE 2
WHEN LENS IS USED FOR DVD
(USED WAVELENGTH : 650nm)

FIG.7B
EXAMPLE 2
WHEN LENS IS USED FOR CD-R
(USED WAVELENGTH : 780nm)

FIG.8A
EXAMPLE 3

WHEN LENS IS USED FOR DVD
(USED WAVELENGTH : 650nm)

NA 0.60

−2.0λ    2.0λ

WAVEFRONT
ABERRATION

FIG.8B
EXAMPLE 3

WHEN LENS IS USED FOR CD-R
(USED WAVELENGTH : 780nm)

NA 0.45

−2.0λ    2.0λ

WAVEFRONT
ABERRATION

FIG.9A
EXAMPLE 4
WHEN LENS IS USED FOR DVD
(USED WAVELENGTH : 650nm)

FIG.9B
EXAMPLE 4
WHEN LENS IS USED FOR CD-R
(USED WAVELENGTH : 780nm)

FIG.10A
EXAMPLE 5
WHEN LENS IS USED FOR DVD
(USED WAVELENGTH : 650nm)

FIG.10B
EXAMPLE 5
WHEN LENS IS USED FOR CD-R
(USED WAVELENGTH : 780nm)

FIG.11

OBJECTIVE LENS FOR OPTICAL RECORDING MEDIA AND OPTICAL PICKUP APPARATUS USING THE SAME

RELATED APPLICATIONS

This application claims the priority of Japanese Patent Application No. 2000-185281 filed on Jun. 20, 2000, which is incorporated herein by reference.

BACKGROUND OF THE INVENTION

1. Field of the Invention

The present invention relates to an objective lens and optical pickup apparatus for recording and reproducing signals, which are commonly usable for two or more kinds of optical recording media. In particular, the present invention relates to an objective lens which, when light beams for irradiating the optical recording media have wavelengths different from each other according to the kinds of optical recording media, can efficiently converge the respective light beams onto their corresponding optical recording media; and an optical pickup apparatus using the same.

2. Description of the Prior Art

In recent years, various kinds of optical recording media have been under development, and optical pickup apparatus which can carry out recording and reproducing while using a plurality of kinds of optical recording media in common have been known. For example, a system which carries out recording and reproducing of DVD (digital versatile disc) and CD-R (recordable optical disc) by using a single optical pickup apparatus has been known.

In such two kinds of optical recording media, for example, visible light at about 650 nm is used for DVD in order to improve the recording density, whereas near-infrared light at about 780 nm is required to be used for CD-R since it has no sensitivity for light in the visible region. An optical pickup apparatus which can be used in common for both of them is based on a dual-wavelength beam type which uses two light beams having wavelengths different from each other.

Since disc thickness values are strictly defined in the two optical recording media exemplified above, it is necessary for the individual wavelengths of light for reproducing or recording to be converged at respective predetermined positions different from each other.

Under such circumstances, a system in which two objective lenses having converging actions different from each other are made switchable depending on the optical recording media subjected to reproducing or recording has been known. However, it complicates the structure of optical pickup apparatus and opposes the demands for compactness and lower cost.

On the other hand, it has recently been known to use a multifocal lens composed of a diffraction optical element or a plurality of zonal areas for an objective lens part of an optical pickup apparatus (Japanese Unexamined Patent Publication No. 8-62493, Japanese Unexamined Patent Publication No. 9-145994, and the like).

In the apparatus using the above-mentioned diffraction optical element, however, a light component of an order different from that contributing to the recording and reproducing emitted from the diffraction optical element becomes noise light. In the apparatus using the above-mentioned multifocal lens, on the other hand, the light transmitted through a circular strip division other than that contributing to the recording and reproducing at that time becomes noise light. Due to these noise light components, the S/N ratio at the recording and reproducing deteriorates.

SUMMARY OF THE INVENTION

In view of the circumstances mentioned above, it is an object of the present invention to provide a compact, inexpensive objective lens with a favorable S/N ratio for optical recording media, which can favorably converge two wavelengths of light onto their corresponding optical recording media having thickness values different from each other without complicating the structure of optical pickup apparatus; and an optical pickup apparatus using the same.

The present invention provides an objective lens, composed of two lenses disposed in a luminous flux, for optical recording media, wherein the two lenses are constituted by respective materials different from each other;

wherein the two lenses satisfy the following conditional expressions (1) and (2) respectively with respect to wavelengths $\lambda_1$ and $\lambda_2$ of light:

$$N_1(\lambda_1) \approx N_2(\lambda_1) \tag{1}$$

$$N_1(\lambda_2) \neq N_2(\lambda_2) \tag{2}$$

where $N_1(\lambda_1)$ is the refractive index of the first lens with respect to wavelength $\lambda_1$ of light;

$N_1(\lambda_2)$ is the refractive index of the first lens with respect to wavelength $\lambda_2$ of light;

$N_2(\lambda_1)$ is the refractive index of the second lens with respect to wavelength $\lambda_1$ of light; and $N_2(\lambda_2)$ is the refractive index of the second lens with respect to wavelength $\lambda_2$ of light; and wherein each lens surface has a form configured so as to suppress aberration in the objective lens as a whole.

Also, the present invention provides an objective lens, composed of three lenses disposed in a luminous flux, for optical recording media, wherein at least adjacent lenses in the three lenses are constituted by respective materials different from each other;

wherein the three lenses satisfy the following conditional expressions (3) and (4) respectively with respect to wavelengths $\lambda_1$ and $\lambda_2$ of light:

$$N_1(\lambda_1) \approx N_2(\lambda_1) \text{ and } N_2(\lambda_1) \approx N_3(\lambda_1) \tag{3}$$

$$N_1(\lambda_2) \neq N_2(\lambda_2) \text{ and } N_2(\lambda_2) \neq N_3(\lambda_2) \tag{4}$$

where $N_1(\lambda_1)$ is the refractive index of the first lens with respect to wavelength $\lambda_1$ of light;

$N_1(\lambda_2)$ is the refractive index of the first lens with respect to wavelength $\lambda_2$ of light;

$N_2(\lambda_1)$ is the refractive index of the second lens with respect to wavelength $\lambda_1$ of light;

$N_2(\lambda_2)$ is the refractive index of the second lens with respect to wavelength $\lambda_2$ of light;

$N_3(\lambda_1)$ is the refractive index of the third lens with respect to wavelength $\lambda_1$ of light; and $N_3(\lambda_2)$ is the refractive index of the third lens with respect to wavelength $\lambda_2$ of light; and wherein each lens surface has a form configured so as to suppress aberration in the objective lens as a whole.

Preferably, the two or three lenses are cemented together. The cemented surface of the two or three lenses may be made aspheric.

The wavelength $\lambda_1$ may be one of wavelengths of 650 nm and 780 nm for recording and reproducing one of DVD and CD-R, whereas the wavelength $\lambda_2$ is the other of wavelengths of 650 nm and 780 nm for recording and reproducing the other of DVD and CD-R.

The present invention provides optical pickup apparatus comprising the above-mentioned objective lenses for optical recording media.

DESCRIPTION OF THE PREFERRED EMBODIMENTS

In the following, an embodiment of the present invention will be explained with reference to the drawings.

First, with reference to FIG. 11, an optical pickup apparatus using the objective lens for optical recording media in accordance with an embodiment of the present invention will be explained.

In this optical pickup apparatus, a semiconductor laser 11B, 11C outputs a laser beam 12 when power is supplied thereto from an LD power source 11A, a half mirror 13 reflects the laser beam 12, a collimator lens 4 turns thus reflected laser beam 12 into parallel light, and an objective lens 5 converts the parallel light into convergent light, with which a recording region 6P of an optical disc 6 is irradiated. The semiconductor laser 11B is a light source for outputting a laser beam in a near-infrared region having a wavelength of about 780 nm for CD-R (recordable optical disc), whereas the semiconductor laser 11C is a light source for outputting a laser beam, for example, in a visible light having a wavelength of 650 nm for DVD (digital versatile disc). The laser beam 12 outputted from one of the semiconductor lasers 11B, 11C irradiates the half mirror 13 by way of a half mirror 11D. A changeover switch 11E is disposed between the LD power source 11A and the semiconductor lasers 11B, 11C. As the changeover switch 11E is operated, power is supplied to one of the semiconductor lasers 11B, 11C.

In the recording region 6P, pits carrying signal information are arranged in a track. The reflected light of laser beam 12 used for reproducing the recording information from region 6P is made incident on the half mirror 13 by way of the objective lens 5 and collimator lens 4 while carrying the signal information, and is transmitted through the half mirror 13, so as to be made incident on a four-part photodiode 7. The respective quantities of light received at the four-part photodiode 7 are arithmetically operated, whereby data signals and respective error signals for focusing and tracking are obtained.

Since the half mirror 13 is inserted in the optical path of the return light from the optical disc 6 in a state tilted by 45°, it acts like a cylindrical lens, so that the light beam transmitted through the half mirror 13 has an astigmatism, whereby the amount of focusing error is determined according to the form of the beam spot of return light on the four-part photodiode 7. Here, the collimator lens 4 can be omitted depending on the circumstances. Also, a grating may be inserted between the semiconductor lasers 11B, 11C and the half mirror 13, such that tracking errors can be detected by use of three beams.

Thus, the optical pickup apparatus in accordance with this embodiment is configured such that signals can be recorded and reproduced for any optical disc 6 of CD-R and DVD.

Here, each of the CD-R and DVD has a protective sheet made of PC (polycarbonate).

Meanwhile, the geometric thickness of CD-R is standardized at 1.2 mm, and one having a refractive index of 1.55 is often used. As for the DVD, on the other hand, one having a geometric thickness of 0.6 mm and a refractive index of 1.58 is often used. Consequently, for securely carrying out focusing on each optical disc 6, it is necessary to provide a configuration yielding focusing actions different from each other for the respective wavelengths of light for recording/reproducing the different kinds of discs.

Figure 11:
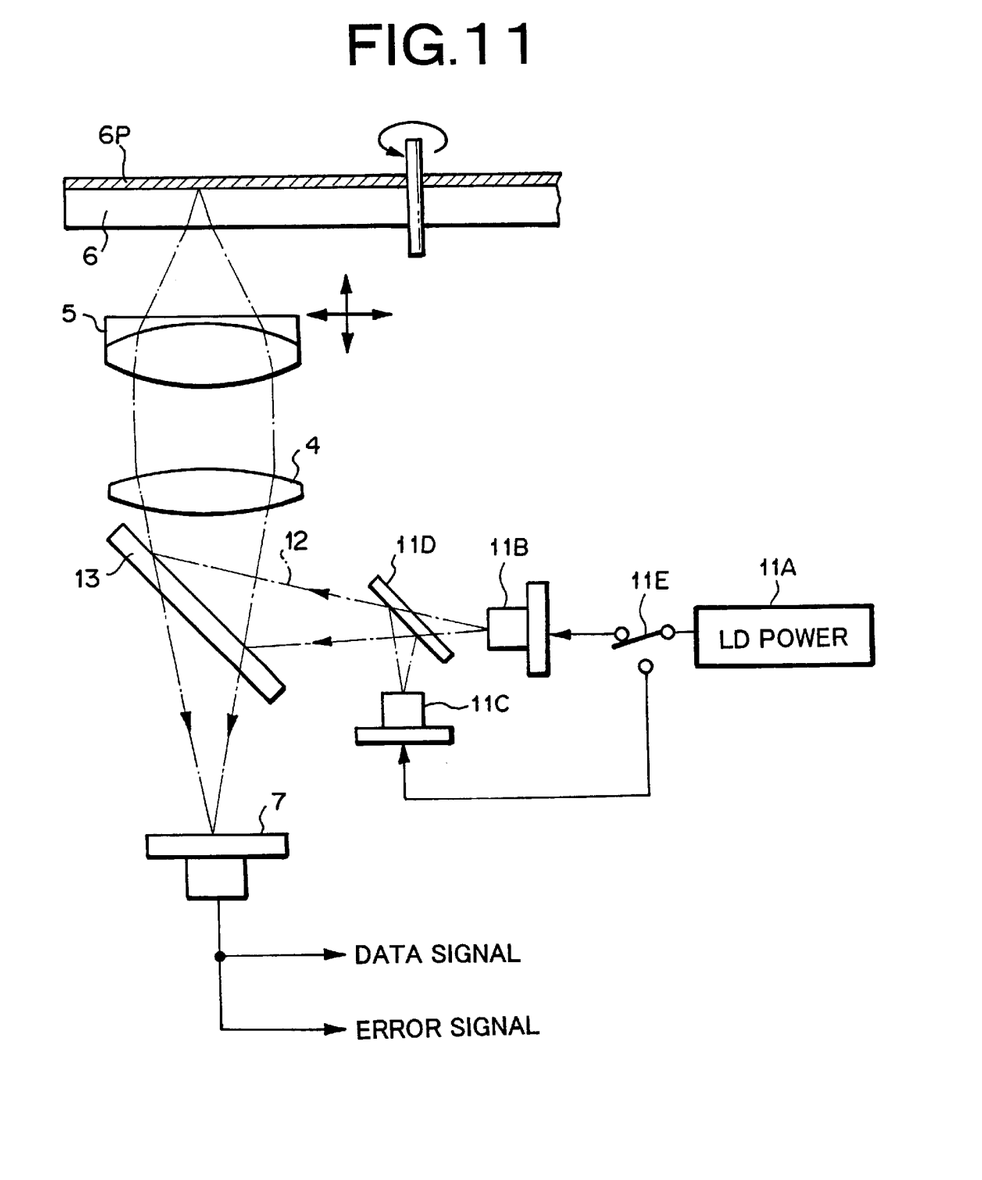
FIG. 11 is a schematic view showing the optical pickup apparatus in accordance with an embodiment of the present invention.

Therefore, the above-mentioned optical pickup apparatus is provided with the objective lens 5 in which a plurality of lenses 1, 2 whose refractive index changing ratios differ from each other according to wavelengths are cemented together as shown in FIG. 11, so that both CD-R and DVD can be recorded and reproduced.

When a DVD is disposed at a predetermined position (on a turntable) for recording or reproducing, the laser beam 12 having a wavelength of 650 nm ($\lambda_1$) from the semiconductor laser 11C is made incident on the objective lens 5 while in a substantially parallel state. In this case, the incident laser beam 12 is converged onto a recording surface of the DVD by the objective lens 5.

When a CD-R is disposed at a predetermined position (on the turntable) for recording or reproducing, the laser beam 12 having a wavelength of 780 nm ($\lambda_2$) from the semiconductor laser 11B is made incident on the objective lens 5 while in a substantially parallel state. In this case, the incident laser beam 12 is converged onto a recording surface of the CD-R by the objective lens 5.

Here, the objective lens is made of a complex lens comprising a plurality of lenses having refractive index changing ratios different from each other according to wavelengths.

The above-mentioned objective lens 5 will now be explained specifically with reference to Examples 1 to 5.

EXAMPLES

Example 1

Figure 1A:
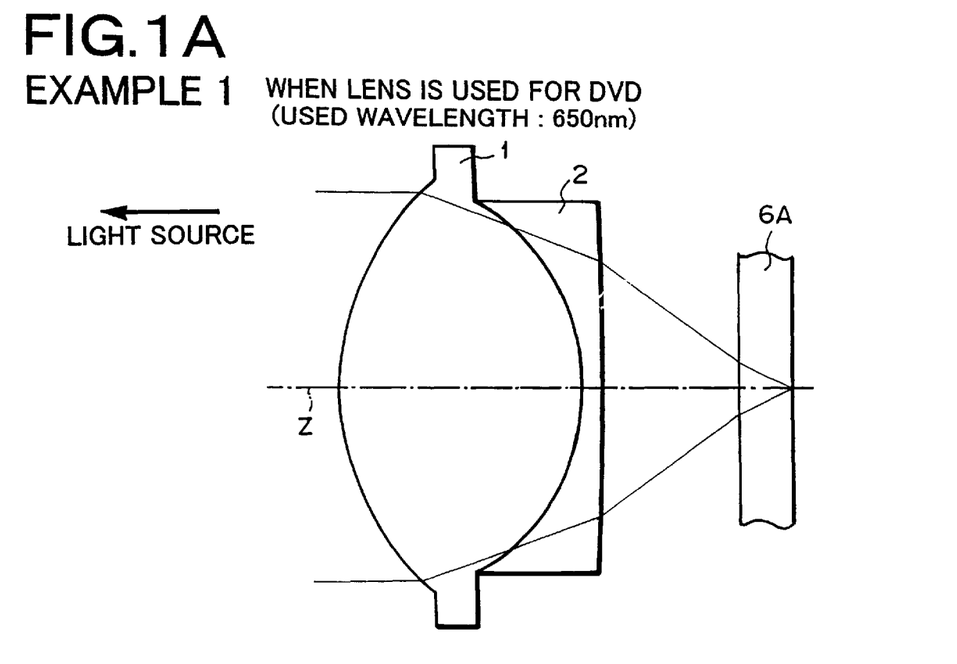
FIGS. 1A and 1B are schematic views showing the states where the objective lens in accordance with Example 1 of the present invention is used for DVD and CD-R, respectively.

When a DVD 6A is disposed at a predetermined position (on a turntable) for recording or reproducing as shown in FIG. 1A, the laser beam 12 having a wavelength of 650 nm ($\lambda_1$) is made incident on the objective lens 5 while in a substantially parallel state. In this case, the incident laser beam 12 is converged onto a recording surface of the DVD 6A by the objective lens 5.

Figure 1B:
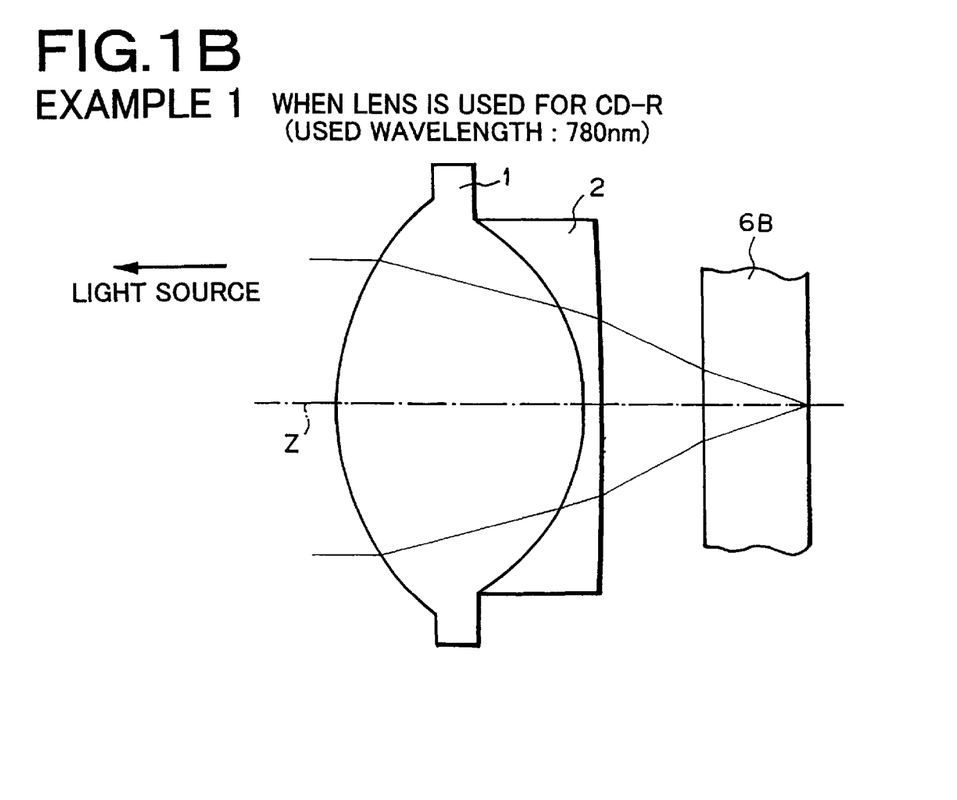

When a CD-R 6B is disposed at a predetermined position (on the turntable) for recording or reproducing as shown in FIG. 1B, on the other hand, the laser beam 12 having a wavelength of 780 nm ($\lambda_2$) is made incident on the objective lens 5 while in a substantially parallel state. In this case, the incident laser beam 12 is converged onto a recording surface of the CD-R 6B by the objective lens 5.

The objective lens 5 in Example 1 comprises, successively from the light source side, a biconvex lens 1 having a convex surface constituted by an aspheric surface (represented by the following aspheric surface expression, ditto for the following aspheric surfaces) directed onto the light source side and a convex surface with a stronger curvature directed onto the light convergent side, and a negative meniscus lens 2 having a concave surface directed onto the light source side and a substantially planar aspheric surface directed onto the light convergent side, which are cemented together. Here, the cemented surface is a spherical surface. Since both sides of the objective lens 5 are constituted by aspheric surfaces, the freedom in designing of aberration correction and the correcting effect can be improved greatly.

$$Z = \frac{Y^2/R}{1+(1-KY^2/R^2)^{1/2}} + \sum_{i=2}^{5} A_i Y^{2i}$$

where

Z is the length of the perpendicular to a tangential plane (plane perpendicular to the optical axis) of an apex of the aspheric surface from a point on the aspheric surface having a distance Y from the optical axis;

Y is the distance from the optical axis;

$A_i$ is the aspheric surface coefficient (i=2 to 5);

R is the radius of curvature of aspheric surface near the optical axis; and

K is the eccentricity.

The upper part of the following Table 1 shows lens data (radius of curvature R, surface space D, and refractive index N with respect to $\lambda$=650 nm and 780 nm) of the objective lens 5 in accordance with Example 1.

As can be seen from Table 1, the difference between the respective refractive indices of the two lenses 1, 2 constituting the objective lens 5 is very small, i.e., 0.00057, for the light having a wavelength $\lambda$ of 650 nm ($\lambda_1$), whereas it is 0.011 for the light having a wavelength $\lambda$ of 780 nm ($\lambda_2$). As a consequence, the refractive index at the boundary (cemented surface) of both lenses 1, 2 is negligible with respect to the light having a wavelength $\lambda$ of 650 nm ($\lambda_1$). Therefore, on a design for the cemented surface, it will be sufficient if the designing for lowering the aspheric aberration of the whole objective lens 5 is carried out while taking account of the light having a wavelength of 780 nm alone. Namely, in this Example, lens glass materials for the two lenses 1, 2 constituting the objective lens 5 are delicately combined together, so as to adjust the lens curvature for one wavelength of light in the two wavelengths in use, whereby the objective lens 5 having a small spherical aberration commonly usable for DVD and CD-R is constructed.

The middle part of Table 1 indicates the aspheric surface coefficient of each aspheric surface.

The lower part of Table 1 indicates the focal length of objective lens 5, the diameter of luminous flux incident on the objective lens 5, and the numerical aperture of objective lens 5 in each of the cases where DVD and CD-R are set as the optical recording medium.

Example 2

Figure 2A:
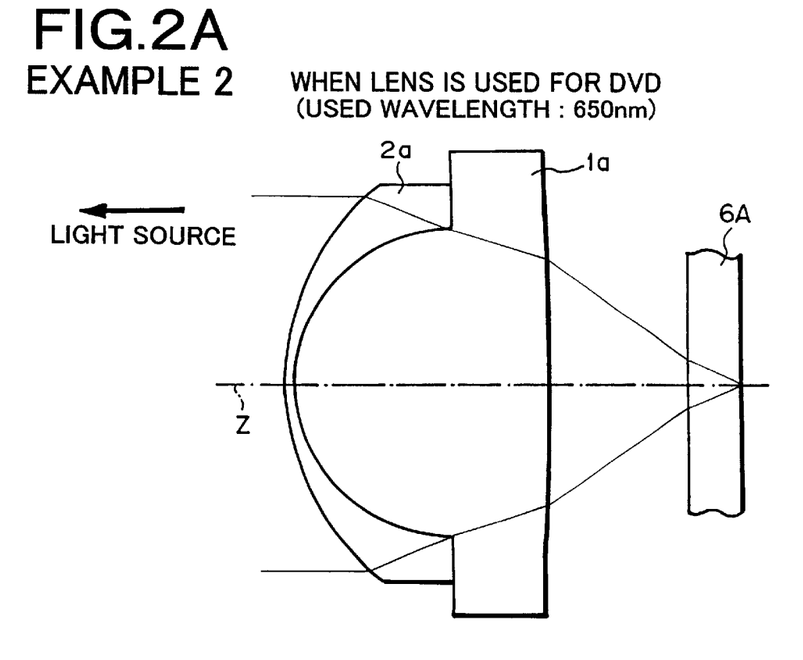
FIGS. 2A and 2B are schematic views showing the states where the objective lens in accordance with Example 2 of the present invention is used for DVD and CD-R, respectively.
Figure 2B:
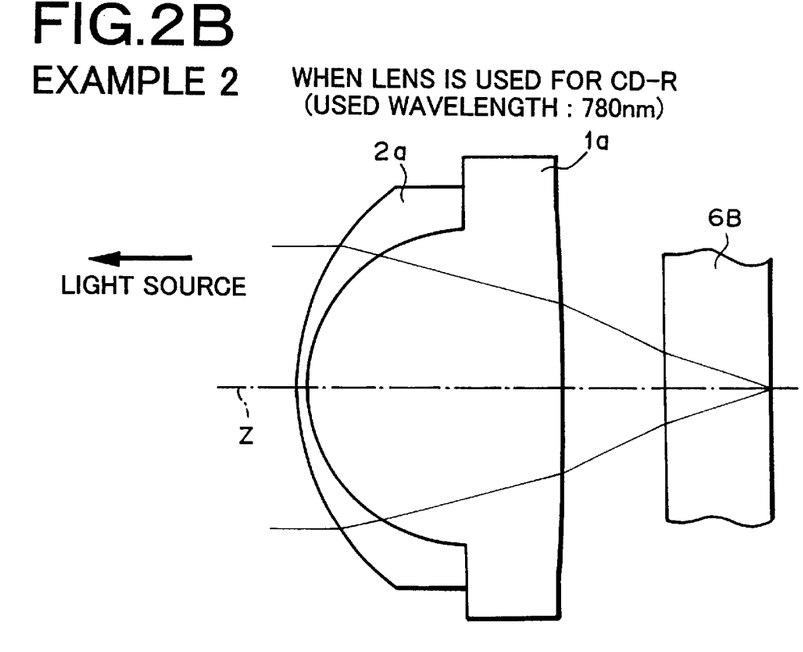

The objective lens 5 in Example 2 comprises, successively from the light source side, a negative meniscus lens 2a having an aspheric convex surface directed onto the light source side and a concave surface directed onto the light convergent side, and a positive lens 1a having a convex surface with a stronger curvature directed onto the light source side and a substantially flat aspheric surface directed onto the light convergent side, which are cemented together. Here, the cemented surface is a spherical surface.

The upper part of the following Table 2 shows lens data (radius of curvature R, surface space D, and refractive index N with respect to $\lambda$=650 nm and 780 nm) of the objective lens 5 in accordance with Example 2.

As can be seen from Table 2, the difference between the respective refractive indices of the two lenses 1a, 2a constituting the objective lens 5 is very small, i.e., 0.00057, for the light having a wavelength $\lambda$ of 650 nm ($\lambda_1$), whereas it is 0.011 for the light having a wavelength $\lambda$ of 780 nm ($\lambda_2$). The resulting operations and effects are substantially the same as those in Example 1.

The middle part of Table 2 indicates the aspheric surface coefficient of each aspheric surface.

The lower part of Table 2 indicates the focal length of objective lens 5, the diameter of luminous flux incident on the objective lens 5, and the numerical aperture of objective lens 5 in each of the cases where DVD and CD-R are set as the optical recording medium.

Example 3

Figure 3A:
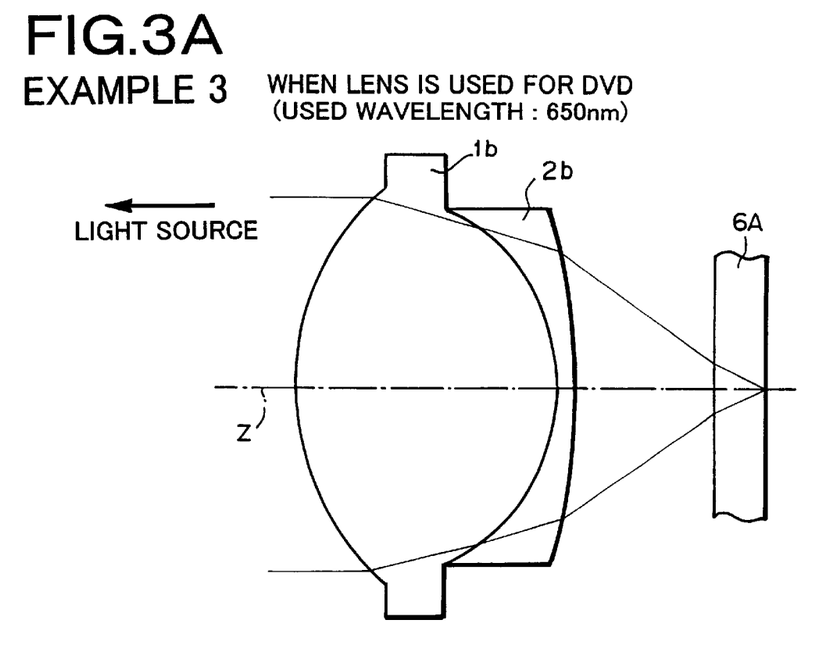
FIGS. 3A and 3B are schematic views showing the states where the objective lens in accordance with Example 3 of the present invention is used for DVD and CD-R, respectively.
Figure 3B:
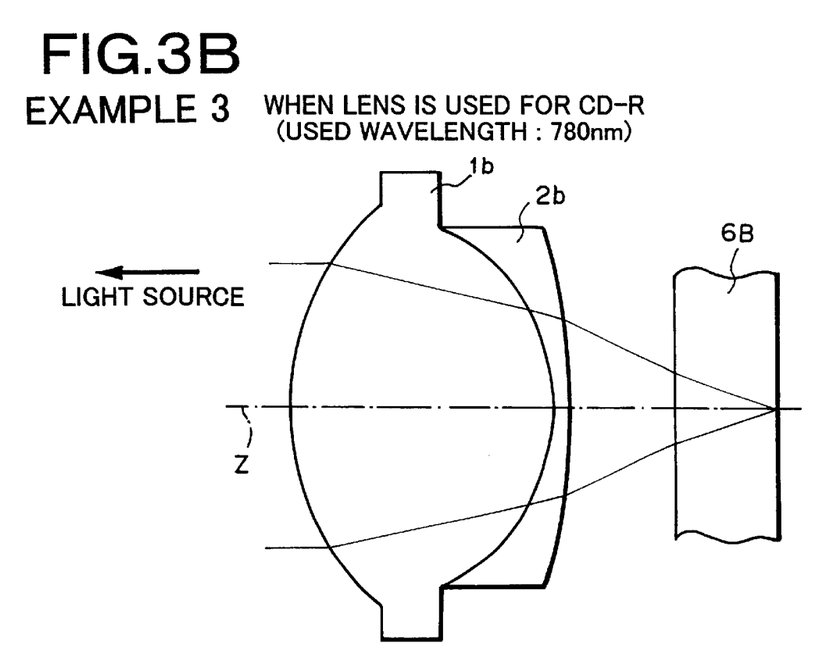

The objective lens 5 in Example 3 comprises, successively from the light source side, a biconvex lens 1b having a convex surface with a stronger curvature directed onto the light convergent side, and a negative meniscus lens 2b having a concave surface directed onto the light source side, which are cemented together. All the lens surfaces including the cemented surface are made aspheric.

The upper part of the following Table 3 shows lens data (radius of curvature R, surface space D, and refractive index N with respect to $\lambda$=650 nm and 780 nm) of the objective lens 5 in accordance with Example 3.

As can be seen from Table 3, the difference between the respective refractive indices of the two lenses 1b, 2b constituting the objective lens 5 is very small, i.e., 0.00016, for the light having a wavelength $\lambda$ of 650 nm ($\lambda_1$), whereas it is 0.01 or greater for the light having a wavelength $\lambda$ of 780 nm ($\lambda_2$). The resulting operations and effects are substantially the same as those in Example 1.

The middle part of Table 3 indicates the aspheric surface coefficient of each aspheric surface.

The lower part of Table 3 indicates the focal length of objective lens 5, the diameter of luminous flux incident on the objective lens 5, and the numerical aperture of objective lens 5 in each of the cases where DVD and CD-R are set as the optical recording medium.

Example 4

Figure 4A:
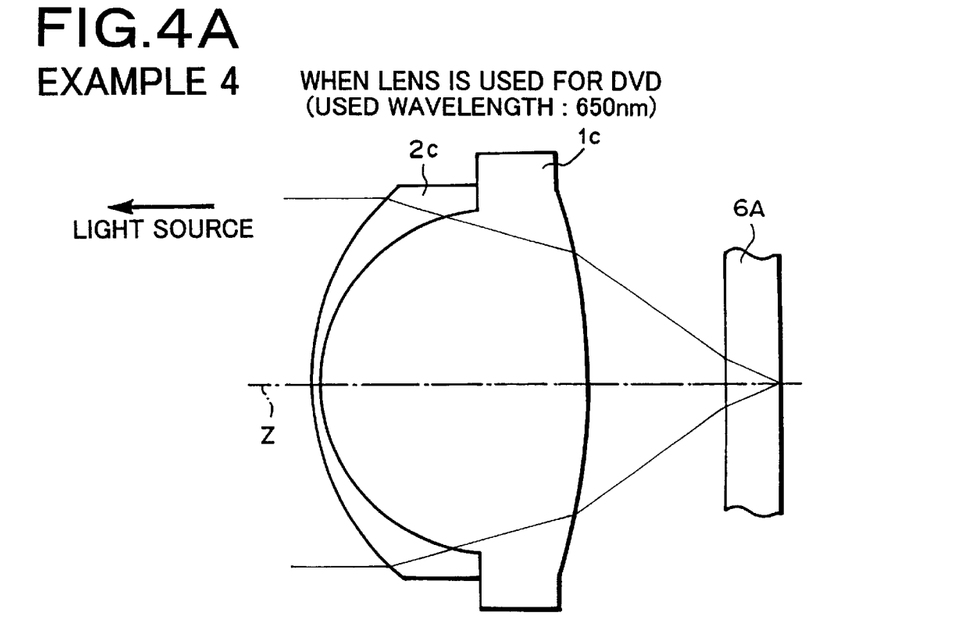
FIGS. 4A and 4B are schematic views showing the states where the objective lens in accordance with Example 4 of the present invention is used for DVD and CD-R, respectively.
Figure 4B:
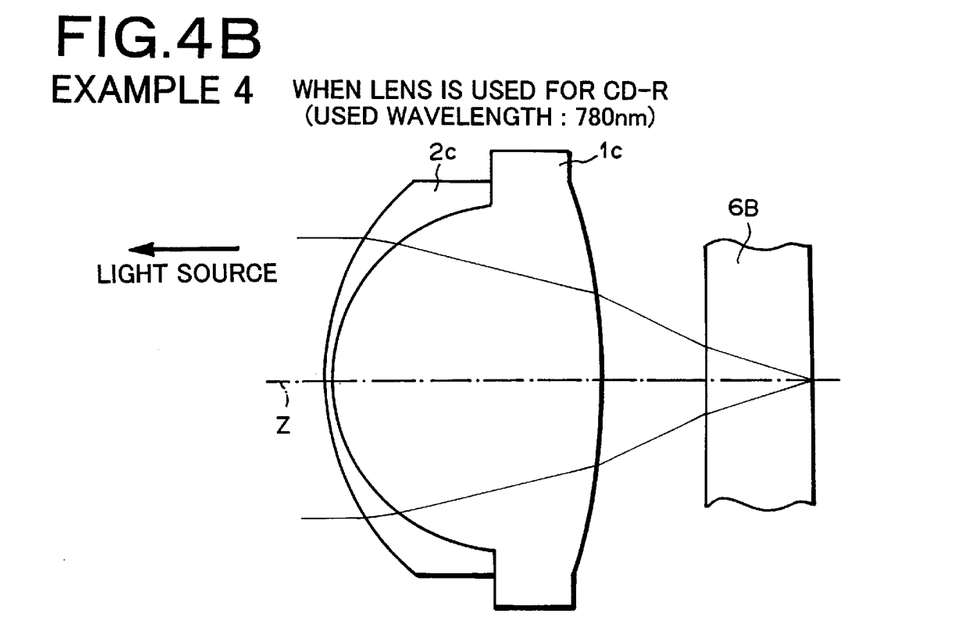

The objective lens 5 in Example 4 comprises, successively from the light source side, a negative meniscus lens 2c having a convex surface directed onto the light source side, and a biconvex lens 1c having a surface with a stronger curvature directed onto the light source side, which are cemented together. All the lens surfaces including the cemented surface are made aspheric.

The upper part of the following Table 4 shows lens data (radius of curvature R, surface space D, and refractive index N with respect to $\lambda$=650 nm and 780 nm) of the objective lens 5 in accordance with Example 4.

As can be seen from Table 4, the difference between the respective refractive indices of the two lenses 1c, 2c constituting the objective lens 5 is very small, i.e., 0.00016, for the light having a wavelength $\lambda$ of 650 nm ($\lambda_1$), whereas it is a value of 0.01 or greater for the light having a wavelength $\lambda$ of 780 nm ($\lambda_2$). The resulting operations and effects are substantially the same as those in Example 1.

The middle part of Table 4 indicates the aspheric surface coefficient of each aspheric surface.

The lower part of Table 4 indicates the focal length of objective lens 5, the diameter of luminous flux incident on the objective lens 5, and the numerical aperture of objective lens 5 in each of the cases where DVD and CD-R are set as the optical recording medium.

Example 5

Figure 5A:
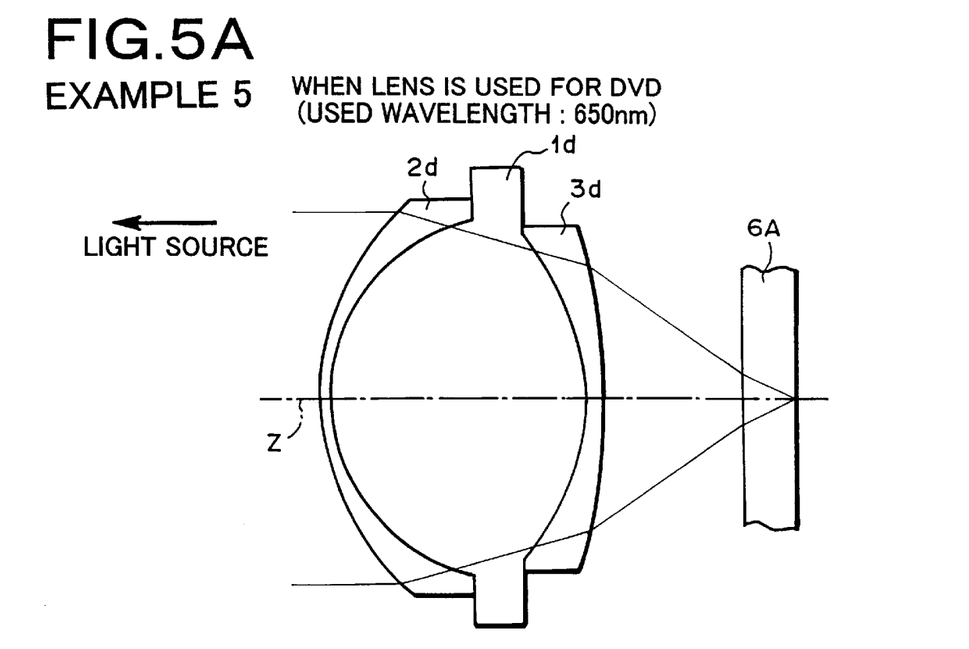
FIGS. 5A and 5B are schematic views showing the states where the objective lens in accordance with Example 5 of the present invention is used for DVD and CD-R, respectively.
Figure 5B:
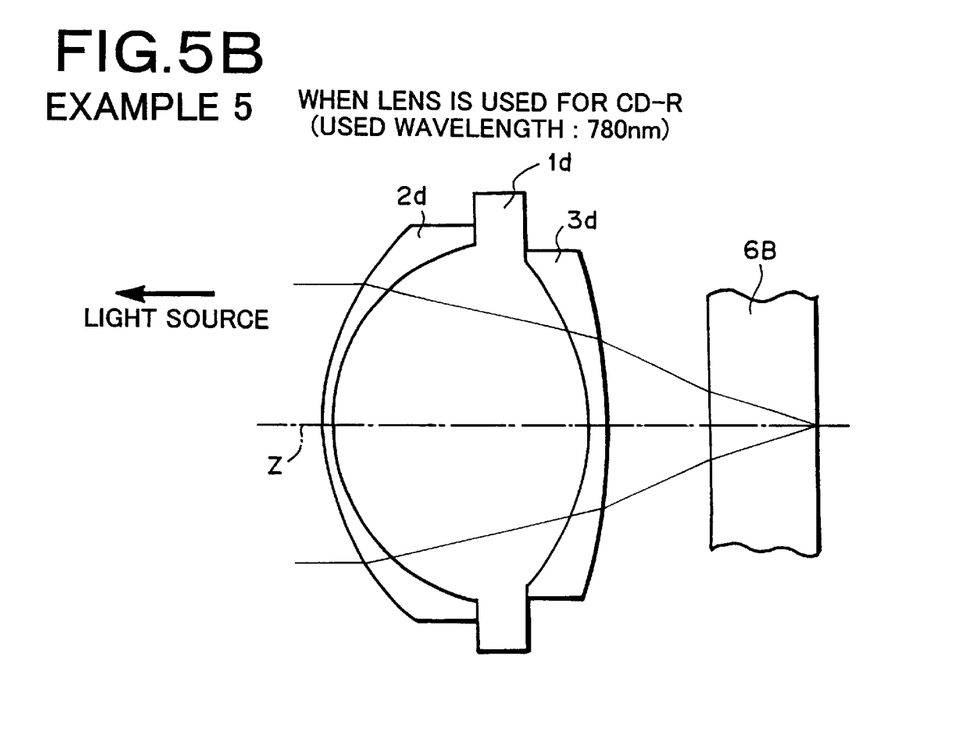
Figure 6A:
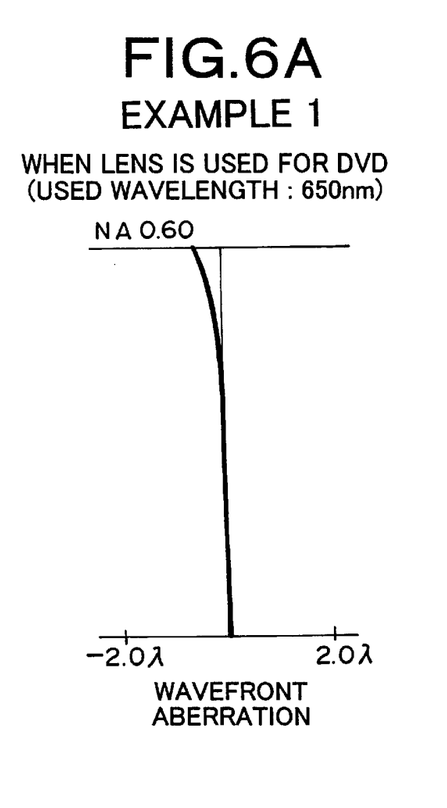
FIGS. 6A and 6B are aberration charts showing wavefront aberrations in Example 1 of the present invention.
Figure 6B:
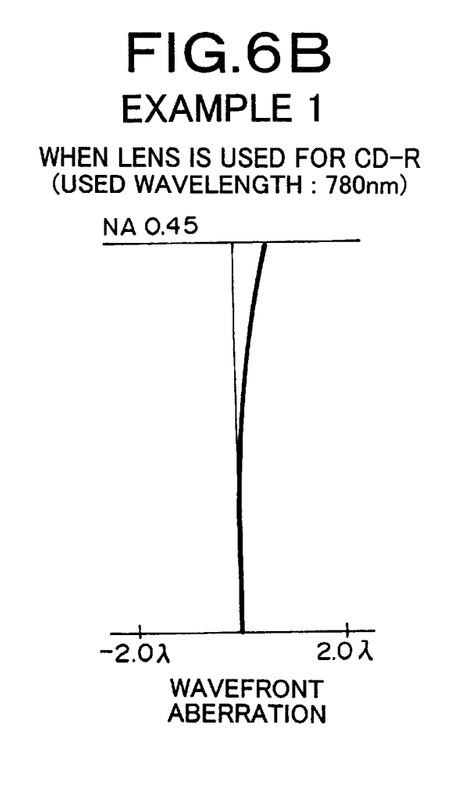
Figure 7A:
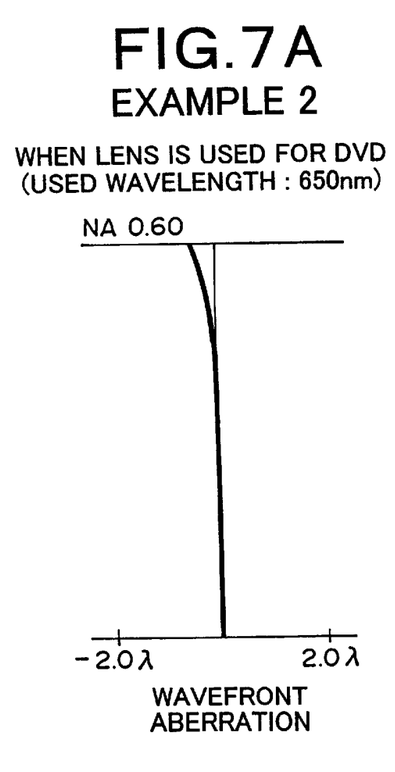
FIGS. 7A and 7B are aberration charts showing wavefront aberrations in Example 2 of the present invention.
Figure 7B:
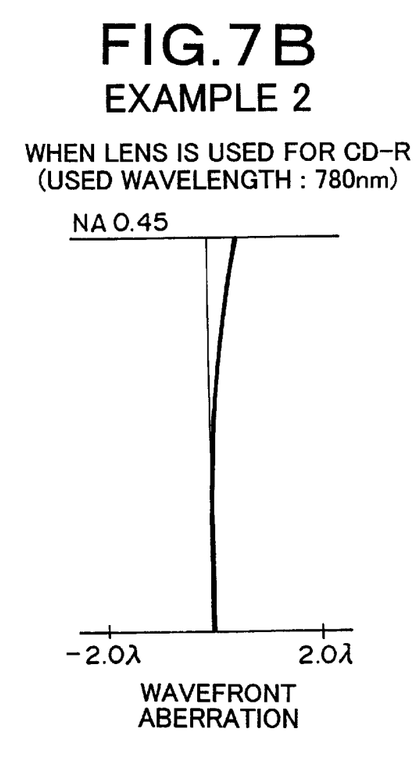
Figure 8A:
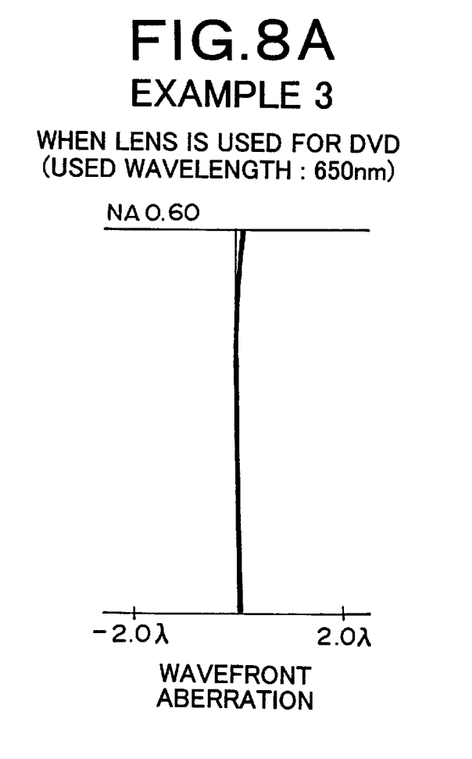
FIGS. 8A and 8B are aberration charts showing wavefront aberrations in Example 3 of the present invention.
Figure 8B:
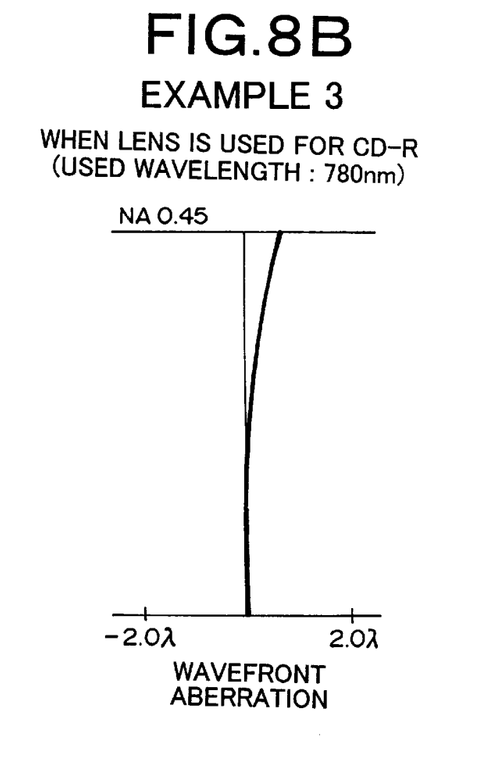
Figure 9A:
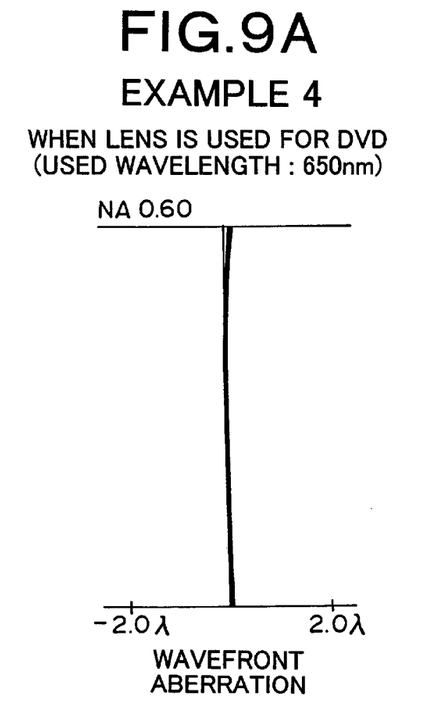
FIGS. 9A and 9B are aberration charts showing wavefront aberrations in Example 4 of the present invention.
Figure 9B:
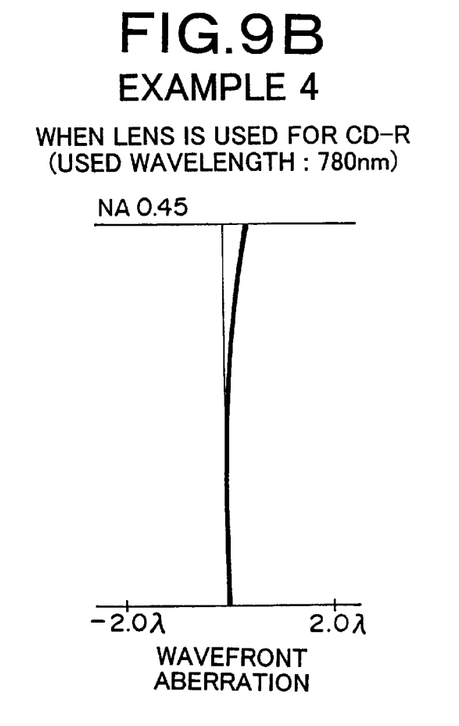
Figure 10A:
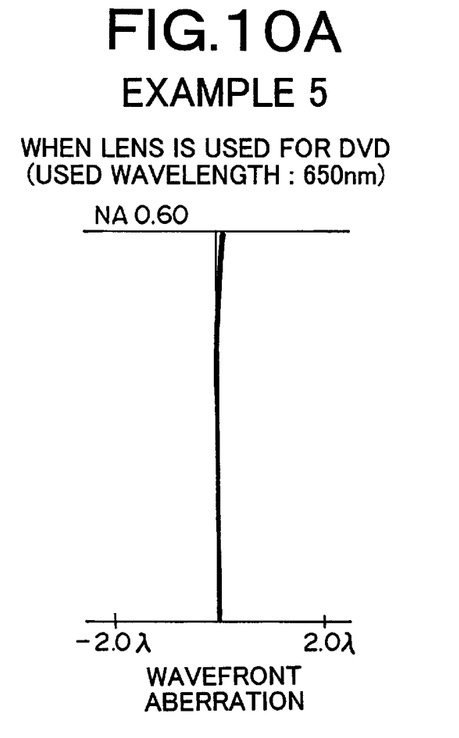
FIGS. 10A and 10B are aberration charts showing wavefront aberrations in Example 5 of the present invention.
Figure 10B:
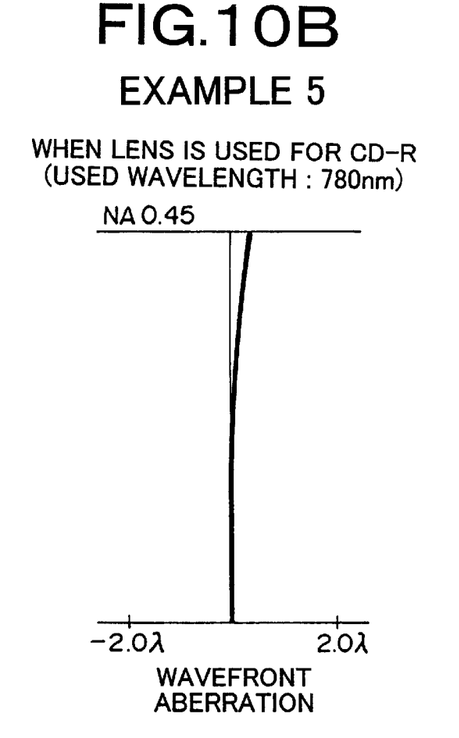

The objective lens 5 in Example 5 comprises, successively from the light source side, a negative meniscus lens 2d having a convex surface directed onto the light source side, a biconvex lens 1d having a surface with a stronger curvature directed onto the light source side, and a negative meniscus lens 3d having a concave surface directed onto the light source side, which are cemented together. Here, both sides of the objective lens 5 are aspheric surfaces, whereas the cemented surfaces are spherical surfaces.

The upper part of the following Table 5 shows lens data (radius of curvature R, surface space D, and refractive index N with respect to $\lambda$=650 nm and 780 nm) of the objective lens 5 in accordance with Example 5.

As can be seen from Table 5, the difference between the respective refractive indices of each pair of adjacent cemented lenses in the three lenses 1d, 2d, 3d constituting the objective lens 5 is very small, i.e., 0.00016, for the light having a wavelength $\lambda$ of 650 nm ($\lambda_1$), whereas it is a value of 0.01 or greater for the light having a wavelength $\lambda$ of 780 nm ($\lambda_2$). The resulting operations and effects are substantially the same as those of Examples constituted by two lenses.

The middle part of Table 5 indicates the aspheric surface coefficient of each aspheric surface.

The lower part of Table 5 indicates the focal length of objective lens 5, the diameter of luminous flux incident on the objective lens 5, and the numerical aperture of objective lens 5 in each of the cases where DVD and CD-R are set as the optical recording medium.

FIGS. 6A to 10B are wavefront aberration charts for the above-mentioned Examples 1 to 5, from which it is clear that each Example is suitable for both DVD and CD-R.

The objective lens of the present invention can be modified in various manners without being restricted to that of the above-mentioned embodiment. For example, a plastic material can be used as a material for forming the lenses. Further, a resin curable by heat or light may be molded into a desirable form while being attached to one lens, whereby a thin lens cemented to one lens can be formed.

If the performance up to about NA=0.6 is secured for light having a wavelength of 780 nm ($\lambda_1$), for example, when determining the form of cemented lens surface, then a specific stop (such as a liquid crystal shutter, a wavelength-selective filter, or the like) for adjusting the NA of DVD and CD-R is unnecessary.

The optical recording media to be recorded and reproduced in the optical pickup apparatus of the present invention are not restricted to DVD and CD-R, whereby the present invention is applicable to any case where a single optical pickup apparatus is used for recording and reproducing two optical recording media which are different from each other in terms of the wavelength regions in use.

Though the optical pickup apparatus in accordance with the above-mentioned embodiment is provided with individual light sources for outputting respective wavelengths of light different from each other, a single light source which can output two wavelengths of light different from each other may be provided instead.

Though $\lambda_1$ and $\lambda_2$ are 650 nm and 780 nm, respectively, in the above-mentioned embodiment, operations and effects equivalent to those mentioned above can also be obtained when $\lambda_1$ and $\lambda_2$ are 780 nm and 650 nm, respectively.

In the objective lens for optical recording media in accordance with the present invention and the optical pickup apparatus using the same, as explained in the foregoing, adjacent lenses constituting the objective lens are constituted by respective materials having refractive index changing ratios different from each other, such that their refractive indices are substantially identical to each other for wavelength $\lambda_1$ of light and differ from each other for wavelength $\lambda_2$ of light, whereas each lens has a form configured so as to suppress aberration in the objective lens as a whole.

Since the refractive index changes depending on the wavelength of light, light is refracted at cemented surfaces or opposed surfaces in a cemented lens or a lens whose opposite surfaces are very close to each other, whereby it is quite difficult to find out a lens form whose aberration becomes favorable even just for two wavelengths.

Therefore, choosing lens forming materials such that the refractive indices of two lenses become substantially equal to each other only at one wavelength while taking account of the fact that it will be sufficient if only the other wavelength is considered as for the fluctuation in amount of aberration caused by the refraction of light at the cemented surface, the present invention selects the form of this cemented surface, thereby enabling two wavelengths of light to be converged, in a state where aberration is favorably corrected, at the recording surfaces of the optical recording media having respective thickness values corresponding thereto.

Hence, there is no fear of the apparatus enlarging its size, complicating its structure, and raising its manufacturing cost as in the conventional objective lenses for optical recording media and optical pickup apparatus in order to ameliorate the aberration.

TABLE 1

| Lens Surface | Radius of Curvature(R) | Surface Space(D) | Refractive index(N) $\lambda = 650$ nm | $\lambda = 780$ nm |
|---|---|---|---|---|
| 1(aspheric) | 2.65760 | 2.80 | 1.69330 | 1.69043 |
| 2(spheric) | −2.34030 | 0.20 | 1.69273 | 1.67943 |
| 3(aspheric) | −22.0422 | | 1.00000 | 1.00000 |

When the lens surface is an aspheric surface, the radius of curvature (R) indicates the radius of curvature near the optical axis.

Aspheric surface coefficient(1st surface)

$A_2$  $3.651604849 \times 10^{-3}$
$A_3$  $8.849215538 \times 10^{-5}$
$A_4$  $6.966383926 \times 10^{-6}$
$A_5$  $-2.584690036 \times 10^{-6}$
K  0.0

Aspheric surface coefficient(3rd surface)

$A_2$  $8.543160379 \times 10^{-3}$
$A_3$  $-2.747241378 \times 10^{-3}$
$A_4$  $3.731236055 \times 10^{-4}$
$A_5$  $-1.635188327 \times 10^{-5}$
K  0.0

For DVD focal length f = 3.598 mm
incident luminous flux diameter Φ 4.32 mm
numerical aperture NA = 0.60

For CD-R focal length f = 3.583 mm
incident luminous flux diameter Φ 3.23 mm
numerical aperture NA = 0.45

TABLE 2

| Lens Surface | Radius of Curvature(R) | Surface Space(D) | Refractive index(N) $\lambda = 650$ nm | $\lambda = 780$ nm |
|---|---|---|---|---|
| 1(aspheric) | 2.65760 | 0.10 | 1.69273 | 1.67943 |
| 2(spheric) | 1.79080 | 2.90 | 1.69330 | 1.69043 |
| 3(aspheric) | −22.0422 | | 1.00000 | 1.00000 |

When the lens surface is an aspheric surface, the radius of curvature (R) indicates the radius of curvature near the optical axis.

Aspheric surface coefficient(1st surface)

$A_2$  $3.647701780 \times 10^{-3}$
$A_3$  $8.885444661 \times 10^{-5}$
$A_4$  $6.646338616 \times 10^{-6}$
$A_5$  $-2.546979068 \times 10^{-6}$
K  0.0

Aspheric surface coefficient(3rd surface)

$A_2$  $8.517314565 \times 10^{-3}$
$A_3$  $-2.738054280 \times 10^{-3}$
$A_4$  $3.715198332 \times 10^{-4}$
$A_5$  $-1.602803438 \times 10^{-5}$
K  0.0

For DVD focal length f = 3.599 mm
incident luminous flux diameter Φ 4.32 mm
numerical aperture NA = 0.60

For CD-R focal length f = 3.591 mm

TABLE 2-continued incident luminous flux diameter Φ 3.23 mm
numerical aperture NA = 0.45

TABLE 3

| Lens Surface | Radius of Curvature(R) | Surface Space(D) | Refractive index(N) $\lambda = 650$ nm | $\lambda = 780$ nm |
|---|---|---|---|---|
| 1(aspheric) | 2.66670 | 3.00 | 1.61527 | 1.61290 |
| 2(aspheric) | −2.27290 | 0.20 | 1.61543 | 1.60263 |
| 3(aspheric) | −7.09950 | | 1.00000 | 1.00000 |

When the lens surface is an aspheric surface, the radius of curvature (R) indicates the radius of curvature near the optical axis.

Aspheric surface coefficient(1st surface)

$A_2$  $2.737129687 \times 10^{-3}$
$A_3$  $-8.973968245 \times 10^{-5}$
$A_4$  $1.615669007 \times 10^{-5}$
$A_5$  $-1.031306979 \times 10^{-5}$
K  0.0

Aspheric surface coefficient(2nd surface)

$A_2$  $-8.364324365 \times 10^{-4}$
$A_3$  $1.360865731 \times 10^{-4}$
$A_4$  $3.256145465 \times 10^{-5}$
$A_5$  $7.989004405 \times 10^{-6}$
K  1.025648198

Aspheric surface coefficient(3rd surface)

$A_2$  $1.091002882 \times 10^{-2}$
$A_3$  $-4.517808156 \times 10^{-3}$
$A_4$  $6.863166966 \times 10^{-4}$
$A_5$  $-4.050313980 \times 10^{-5}$
K  0.0

For DVD focal length f = 3.600 mm
incident luminous flux diameter Φ 4.32 mm
numerical aperture NA = 0.60

For CD-R focal length f = 3.590 mm
incident luminous flux diameter Φ 3.23 mm
numerical aperture NA = 0.45

TABLE 4

| Lens Surface | Radius of Curvature(R) | Surface Space(D) | Refractive index(N) $\lambda = 650$ nm | $\lambda = 780$ nm |
|---|---|---|---|---|
| 1(aspheric) | 2.66670 | 0.10 | 1.61543 | 1.60263 |
| 2(aspheric) | 2.28140 | 3.10 | 1.61527 | 1.61290 |
| 3(aspheric) | −7.09950 | | 1.00000 | 1.00000 |

When the lens surface is an aspheric surface, the radius of curvature (R) indicates the radius of curvature near the optical axis.

Aspheric surface coefficient(1st surface)

$A_2$  $2.733562707 \times 10^{-3}$
$A_3$  $-9.125805890 \times 10^{-5}$
$A_4$  $1.743103824 \times 10^{-5}$
$A_5$  $-1.046751456 \times 10^{-5}$
K  0.0

Aspheric surface coefficient(2nd surface)

$A_2$  $3.307481221 \times 10^{-3}$
$A_3$  $-1.789070427 \times 10^{-4}$
$A_4$  $-3.474611465 \times 10^{-5}$

TABLE 4-continued

| | |
|---|---|
| $A_5$ | $-7.895685988 \times 10^{-6}$ |
| K | 1.378244334 |

Aspheric surface coefficient(3rd surface)

| | |
|---|---|
| $A_2$ | $1.084485345 \times 10^{-2}$ |
| $A_3$ | $-4.441698767 \times 10^{-3}$ |
| $A_4$ | $6.567728685 \times 10^{-4}$ |
| $A_5$ | $-3.671804744 \times 10^{-5}$ |
| K | 0.0 |

For DVD focal length f = 3.600 mm
incident luminous flux diameter Φ 4.32 mm
numerical aperture NA = 0.60

For CD-R focal length f = 3.606 mm
incident luminous flux diameter Φ 3.25 mm
numerical aperture NA = 0.45

TABLE 5

| Lens Surface | Radius of Curvature(R) | Surface Space(D) | Refractive index(N) λ = 650 nm | λ = 780 nm |
|---|---|---|---|---|
| 1(aspheric) | 2.66670 | 0.10 | 1.61543 | 1.60263 |
| 2(spheric) | 2.13650 | 2.90 | 1.61527 | 1.61290 |
| 3(spheric) | -2.87910 | 0.20 | 1.61543 | 1.60263 |
| 4(aspheric) | -7.09950 | | 1.00000 | 1.00000 |

When the lens surface is an aspheric surface, the radius of curvature (R) indicates the radius of curvature near the optical axis.

Aspheric surface coefficient(1st surface)

| | |
|---|---|
| $A_2$ | $2.733562707 \times 10^{-3}$ |
| $A_3$ | $-9.125805890 \times 10^{-5}$ |
| $A_4$ | $1.743103824 \times 10^{-5}$ |
| $A_5$ | $-1.046751456 \times 10^{-5}$ |
| K | 0.0 |

Aspheric surface coefficient(4th surface)

| | |
|---|---|
| $A_2$ | $1.084485345 \times 10^{-2}$ |
| $A_3$ | $-4.441698767 \times 10^{-3}$ |
| $A_4$ | $6.567728685 \times 10^{-4}$ |
| $A_5$ | $-3.671804744 \times 10^{-5}$ |
| K | 0.0 |

For DVD focal length f = 3.600 mm
incident luminous flux diameter Φ 4.32 mm
numerical aperture NA = 0.60

For CD-R focal length f = 3.587 mm
incident luminous flux diameter Φ 3.23 mm
numerical aperture NA = 0.45

What is claimed is:

1. An objective lens, consisting of two lenses disposed in a luminous flux, for carrying out focusing on two optical recording media having different thicknesses from each other, wherein said two lenses are constituted by respective materials different from each other;

wherein said two lenses satisfy the following conditional expressions (1) and (2) respectively with respect to wavelengths $\lambda_1$ and $\lambda_2$ of light:

$$N_1(\lambda_1) \approx N_2(\lambda_1) \tag{1}$$

$$N_1(\lambda_2) \neq N_2(\lambda_2) \tag{2}$$

where $N_1(\lambda_1)$ is the refractive index of the first lens with respect to wavelength $\lambda_1$ of light;

$N_1(\lambda_2)$ is the refractive index of the first lens with respect to wavelength $\lambda_2$ of light;

$N_2(\lambda_1)$ is the refractive index of the second lens with respect to wavelength $\lambda_1$ of light; and $N_2(\lambda_2)$ is the refractive index of the second lens with respect to wavelength $\lambda_2$ of light;

wherein approximately equal to in equation (1) is defined as values equal to or less than 0.00057;

wherein each lens surface has a form configured so as to suppress aberration in said objective lens as a whole, and wherein said wavelength $\lambda_1$ is used for one optical media and said wavelength $\lambda_2$ is used for another optical media.

2. An objective lens according to claim 1, wherein said two lenses are cemented together.

3. An objective lens according to claim 2, wherein said cemented surface is made aspheric.

4. An objective lens according to claim 1, wherein said wavelength $\lambda_1$ is one of wavelengths of 650 nm and 780 nm for recording and reproducing one of DVD and CD-R, whereas the wavelength $\lambda_2$ is the other of wavelengths of 650 nm and 780 nm for recording and reproducing the other of DVD and CD-R.

5. An optical pickup apparatus comprising the objective lens according to claim 1.

6. An objective lens, consisting of three lenses disposed in a luminous flux, for carrying out focusing on two optical recording media having different thicknesses from each other, wherein at least adjacent lenses in said three lenses are constituted by respective materials different from each other;

wherein said three lenses satisfy the following conditional expressions (3) and (4) respectively with respect to wavelengths $\lambda_1$ and $\lambda_2$ of light:

$$N_1(\lambda_1) \approx N_2(\lambda_1) \text{ and } N_2(\lambda_1) \approx N_3(\lambda_1) \tag{3}$$

$$N_1(\lambda_2) \neq N_2(\lambda_2) \text{ and } N_2(\lambda_2) \neq N_3(\lambda_2) \tag{4}$$

where $N_1(\lambda_1)$ is the refractive index of the first lens with respect to wavelength $\lambda_1$ of light;

$N_1(\lambda_2)$ is the refractive index of the first lens with respect to wavelength $\lambda_2$ of light;

$N_2(\lambda_1)$ is the refractive index of the second lens with respect to wavelength $\lambda_1$ of light;

$N_2(\lambda_2)$ is the refractive index of the second lens with respect to wavelength $\lambda_2$ of light;

$N_3(\lambda_1)$ is the refractive index of the third lens with respect to wavelength $\lambda_1$ of light; and $N_3(\lambda_2)$ is the refractive index of the third lens with respect to wavelength $\lambda_2$ of light;

wherein approximately equal to in equation (3) is defined as values equal to or less than 0.00057;

wherein each lens surface has a form configured so as to suppress aberration in said objective lens as a whole, and wherein said wavelength $\lambda_1$ is used for one optical media and said wavelength $\lambda_2$ is used for another optical media.

7. An objective lens according to claim 6, wherein said three lenses are cemented together.

8. An objective lens according to claim 7, wherein at least one of said cemented surfaces is made aspheric.

9. An objective lens according to claim 6, wherein said wavelength $\lambda_1$ is one of wavelengths of 650 nm and 780 nm for recording and reproducing one of DVD and CD-R, whereas the wavelength $\lambda_2$ is the other of wavelengths of 650 nm and 780 nm for recording and reproducing the other of DVD and CD-R.

10. An optical pickup apparatus comprising the objective lens according to claim 6.

* * * * *